United States Patent [19]

Ban et al.

[11] Patent Number: 4,566,519
[45] Date of Patent: * Jan. 28, 1986

[54] METHOD OF MAKING A CONNECTING ROD

[75] Inventors: Keisuke Ban; Yasuo Ohashi, both of Fujimi, Japan

[73] Assignee: Honda Giken Kogyo Kabushiki Kaisha, Tokyo, Japan

[*] Notice: The portion of the term of this patent subsequent to Aug. 13, 2002 has been disclaimed.

[21] Appl. No.: 446,360

[22] Filed: Dec. 2, 1982

[30] Foreign Application Priority Data

Dec. 2, 1981 [JP] Japan .................................. 56-194134

[51] Int. Cl.⁴ ........................ B22D 18/02; B22D 19/14
[52] U.S. Cl. ........................................ 164/97; 164/112
[58] Field of Search ........................... 164/97, 112, 110

[56] References Cited

U.S. PATENT DOCUMENTS

| | | | |
|---|---|---|---|
| 4,266,596 | 5/1981 | Ban et al. | 164/97 |
| 4,318,438 | 3/1982 | Ban et al. | 164/97 |
| 4,357,986 | 11/1982 | Ban et al. | 164/97 |

Primary Examiner—Nicholas P. Godici
Assistant Examiner—J. Reed Batten, Jr.
Attorney, Agent, or Firm—Armstrong, Nikaido, Marmelstein & Kubovcik

[57] ABSTRACT

A method of making a connecting rod for an internal combustion engine which includes shaping a bundle of unidirectional inorganic fibers, placing the bundle into a shaping container and heating it partially in order to fuse the fibers to each other. The partially fused bundle is positioned in a mold in such a manner to produce an extra gap for a predetermined machining allowance between the bundles and cavities. A molten light metal alloy is squeeze cast into the mold under high pressure, i.e., 500–2000 kg/cm$^3$, forming a matrix annular layer around the bundle. The rod portion of the obtained connecting rod is machined to remove defects in casting, such as a fatigue crack, a blow-hole or mixing of oxidated substances and takes the shape of a circular or elliptical cross-section.

5 Claims, 4 Drawing Figures

METHOD OF MAKING A CONNECTING ROD

BACKGROUND OF THE INVENTION

The present invention relates to a method of manufacturing a connecting rod for an internal combustion engine and more particularly to a method of manufacturing a connecting rod having a bundle of uni-directional inorganic fibers filled in and combined with a matrix of light alloy in the longitudinal center portion of the rod.

The fiber-reinforced connecting rod shown in FIGS. 3 and 4 has been previously proposed and comprises a small annular end portion, a large annular end portion B and a rod portion R connecting the small and large annular end portions.

The rod portion R has a core made of a bundle of uni-directional inorganic fibers filled in and combined with a light alloy matrix, and a single component matrix portion formed outside of the core. The small end portion can be considered to have a central axis. In a cross-sectional view of the rod portion R in FIG. 4, the single component matrix portion includes a pair of rectangular portions $M_1$ formed along the central axis of the small end portion in such a manner as to sandwich the core of fibers and alloy and a pair of arc-shaped portions $M_2$ formed between the rectangular portions $M_1$ and also sandwiching the core of fibers and alloy. Notches are formed between the rectangular portions and the arc-shaped portions. The concentration of stress is higher at the notches and, therefore, a factor of stress concentration is relatively increased. The single component matrix portion is made by squeeze casting and, therefore, the strength of the rod portion is higher than other general cast articles. However, it has been found in the practice of a fatigue test that the single component matrix portion was inclined to have an initiation of a fatigue crack. The crack extended all over the single component matrix portion to surround the core of the bundle of fibers. Finally, it caused a premature fatigue failure. It has been found further that when such a single component matrix portion had a defect in casting, for example, a mixing of oxidated substance, a blow-hole, etc., the fatigue strength was liable to be variable. As a result, the lifetime of the single component matrix portion could not be kept constant or predicted.

SUMMARY OF THE INVENTION

It is an object of the present invention to provide a method of making a connecting rod having a fiber reinforced portion for an internal combustion engine which can avoid generation of fatigue failure.

It is another object of the present invention to provide a method of making a connecting rod having a high fatigue limit and a reliable, predictable lifetime.

According to the present invention, the method of making the connecting rod having a fiber-reinforced portion therein comprises the steps of forming a bundle of uni-directional inorganic fibers, placing the bundle of fibers in a mold, squeeze casting a molten light metal alloy into the mold forming a matrix of the alloy and the bundle, and machining a rod portion of connecting rod obtained by squeeze casting to a predetermined shape.

According to the present invention, there is obtained a connecting rod including a bundle of uni-directional inorganic fibers filled in and combined with matrix and a single component matrix annular layer surrounding the bundle having a sufficient predetermined machining allowance. The sufficient predetermined machining allowance is added to the gap between the bundle and the wall of the cavity of the mold and enables a smooth-flow of the molten light metal alloy in the mold. The tendency for cold shut is thereby reduced and the filling performance of the molten metal into the bundle of uni-directional inorganic fibers is improved. The squeeze casting comprises the steps of applying a hydrostatic high pressure of 500–2000 kg/cm² to a molten light metal alloy poured into a mold and solidifying the molten metal under such high pressure. A part of or the entire single component matrix annular layer is thereafter machined so that the portion where there is a tendency for the initiation of fatigue cracks or where there is any other defective portion in casting is reduced and removed. It would be desirable to elimin- ate any possibility of the initiation of a fatigue crack by machining away the entire single component matrix annular layer thereby exposing the core bundle of uni-directional inorganic fibers. However, this could result not only in a difficulty of machining and interfacial separation of reinforcing fibers, but also in a decrease of strength of the rod portion. Therefore, the single component matrix annular layer is generally only partially cut away. Moreover, a connecting rod having a circular or elliptical shape in cross-sectional view of the rod portion is easily obtained by machining the single component matrix annular layer. In this manner, the factor of stress concentration of the matrix annular layer can be decreased and also the fatigue limit can be remarkably improved.

The foregoing object, other objects, as well as the specific method of manufacturing the fiber-reinforced connecting rod according to the present invention will become more apparent from the following detailed description of the present invention in reference to a preferred example thereof.

DETAILED DESCRIPTION OF THE PRESENT INVENTION

Figure 1:
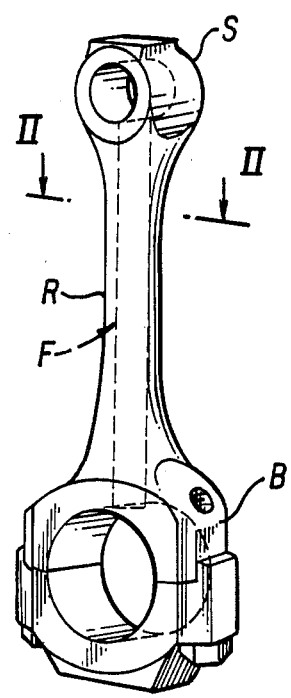
FIG. 1 is a perspective illustration of a connecting rod made in accordance with the present invention.
Figure 2:
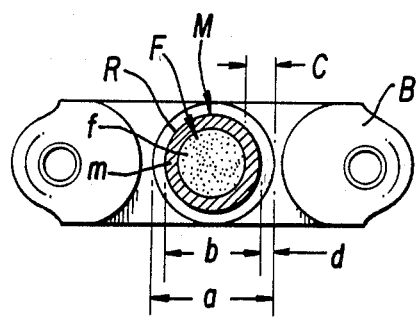
FIG. 2 is a cross-sectional view taken along Line II—II of FIG. 1.

A connecting rod made in accordance with the present invention is shown in FIGS. 1 and 2. It is produced as follows:

A bundle of 65,000 stainless steel fibers (SUS 33 in accordance with Japanese Industrial Standards (JIS)) each having an outside diameter of 25 microns was prepared and inserted into a heat-resistant tube. The tube could be made, for example, of silica glass. The shape of the cross-section of the tube is a circular shape. The bundle of stainless steel fibers are heated at 700° C. for ten minutes. In this manner, the stainless steel fibers are partially fused together. That is, at the points where the different fibers touch each other, they are fused or welded together. The diameter of the round cross-section was 11 mm. The bundle was 128 mm long. The bulk density is 2.62 g/cc.

A mold for forming the connecting rod was prepared having a first ram-up core for forming the small diameter annular end portion and a second ram-up core for forming the large diameter semi-annular end portion. The uni-directional bundle of inorganic fibers prepared above was laid within the previously prepared concave portions of the mold between the ram-up cores as a bridge Using an aluminum alloy (AC4D in accordance with Japanese Industrial Standards (JIS)) as the matrix metal m, the molten metal alloy was filled into the uni-directional bundle of inorganic fibers and squeeze cast to produce the connecting rod having a predetermined machining allowance.

After that, the rod-shaped portion of the connecting rod was machined and the connecting rod having the rod-shaped portion R with a circular cross-section (FIG. 2) was obtained.

The rod-shaped portion R of this connecting rod has its center occupied and reinforced by the uni-directional bundle of inorganic fibers aligned along the longitudinal axis of the rod portion, with the bundle of inorganic fibers being filled and compounded by the light metal alloy matrix, and, a light metal alloy matrix layer having a predetermined maching allowance around the core.

Table I shows the characteristics of the rod portion before machining and after machining:

TABLE I

|  | Rod Portion Before Machining | Rod Portion After Machining |
| --- | --- | --- |
| Diameter | 20.5 mm (a of Figure 2) | 16.5 mm (b of Figure 2) |
| Cross-Sectional Area | 329.9 mm² | 213.7 mm² |
| Volume Fraction $V_f$ of This Bundle | — | 14.9% |
| Gap Between the Wall of the Mold Cavity and the Fiber Bundle Prior to Casting | 4.75 mm (c of Figure 2) | — |
| Allowance | 2 mm (d of Figure 2) | — |

Figure 3:
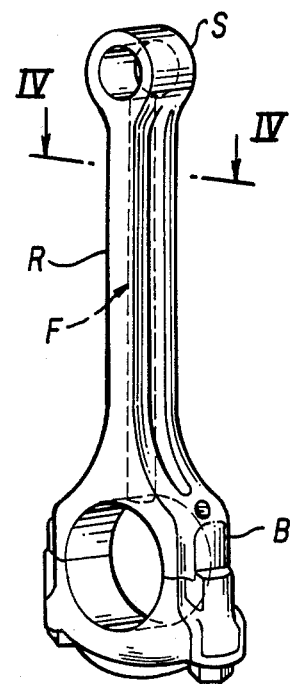
FIG. 3 is a perspective illustration of a connecting rod made in accordance with a previously proposed method.
Figure 4:
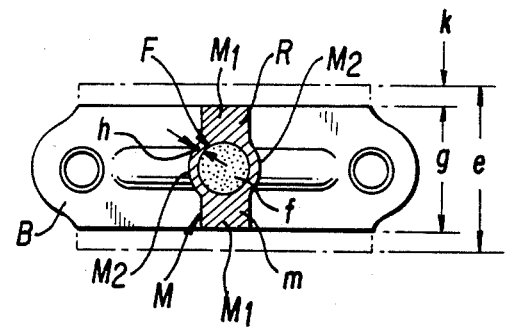
FIG. 4 is a cross-sectional view taken along Line IV—IV of FIG. 3.

A connecting rod made in accordance with a previously proposed method is shown in FIGS. 3 and 4. This previously proposed method is as follows:

A bundle of 65,000 stainless steel fibers (SUS 33 in accordance with Japanese Industrial Standards (JIS)) each having an outside diameter of 25 microns was prepared and inserted into a heat resistant tube. The tube could be made, for example, of silica glass. The shape of the cross-section of the tube is circular. The bundle of stainless steel fibers were heated at 700° C. for ten minutes. In this manner, the stainless fibers are partially fused together. That is, at the point of where the different fibers touch each other, they are fused or welded together The temperature of about 700° C. is critical because if the fibers are heated at a higher temperature, the fibers lose their strength. The diameter of the round cross-section was 9.5 mm. The bundle was 128 mm long. The bulk density was 3.5 grams/cc.

A mold was prepared having a ram-up core for forming the small diameter annular end portion and a ram-up core for forming the large diameter semi-annular end portion.

The uni-directional bundle of inorganic fibers prepared above was laid within previously prepared concave portions of the mold between the ram-up cores as a bridge.

Using an aluminum alloy (AC4D in accordance with Japanese Industrial Standards (JIS)) as the matrix, the alloy was filled into the uni-directional bundle of inorganic fibers and squeeze cast to produce the connecting rod. Following casting, both side face surfaces of the connecting rods of both end portions were machined to remove the material K shown in FIG. 4. The machining was done to ensure that the faces of the large diameter semi-annular end portion and the small diameter annular end portion were parallel with each other and perpendicular to the axis of the openings.

Table II shows the characteristics and material after machining of the end portions:

TABLE II

|  | Before Machining | After Machining |
| --- | --- | --- |
| Width e or g Shown in Figure 4 of Connecting Rod | 33.8 mm (e of Figure 4) | 21.8 mm (g of Figure 4) |
| Cross-Sectional Are of Rod Portion | 331.7 mm² | 218.9 mm² |
| Volume Fraction $V_f$ of Fiber Bundle of Rod Portion | — | 14.6% |
| Gap Between the Wall of the Mold Cavity and the Fiber Bundle Prior to Casting | 2 mm (h of Figure 4) | — |
| Cutting Area for Machining | 6 mm (k of Figure 4) | — |

As can be readily understood from the comparison of the above Table I, II, the gap of the present invention between the uni-directional bundle of inorganic fibers and the sidewall of the cavity of the mold is wider than in the previously proposed method. Therefore, the running performance of molten metal is simplified, and this reduces the tendency of cold shut. Additionally, the filling and compounding performances of the matrix are very good.

A stress-concentration factor, average fatigue limit at room temperature and standard deviation of said fatigue limit at room temperature between the present invention's connecting rod and previously proposed methods are shown in the following Table III:

TABLE III

|  | Present Invention | Previously Proposed Method |
| --- | --- | --- |
| Stress-Concentration Factor | 1.0 | 1.35 |
| Average Value of Fatigue Limit | 15.1 kg/mm² | 11.2 kg/mm² |
| Standard Deviation of Fatigue Limit | 1.1 kg/mm² | 1.5 kg/mm² |

As can be readily understood from the above Table III, stress-concentration factor is (1.0) in the present invention. This value means that the cross-sectional area of rod-shaped portion is round in shape and so a stress-concentration part does not exist.

Therefore, the average fatigue limit increased and its standard deviation was improved. This means that the reliability of this connecting rod became high.

In the present invention, the purposeful provision of the predetermined machining allowance around the rod portion has the advantage that a larger gap is used in the mold. This enables the molten metal to flow smoothly between mold cavity wall and the uni-directional bundle of inorganic fibers. Molten metal running performance is good and cold shuts are prevented. The molten metal matrix is filled into the uni-directional bundle smoothly.

It is possible to eliminate or significantly decrease the problems of defects of casting and fatigue crack initiation part by machining the surface of the light metal alloy matrix layer. In this manner, the fatigue limit is increased and it becomes possible to predict the lift of the connecting rod. A highly reliable connecting rod is produced.

It is readily apparent that the above-described method of making a connecting rod meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention:

What is claimed is:

1. A method of making a connecting rod for an internal combustion engine, the rod having a smaller annular end portion, a larger end portion, and a rod portion therebetween, the rod portion having a longitudinal axis, the method comprising the steps of:
    shaping a bundle of inorganic reinforcing fibers; placing the bundle in a mold, the mold having cavities to form the annular end portions and a rod portion having a circular cross-section, the bundle being placed along the longitudinal axis of the rod portion cavity, the mold being sized such that there is a predetermined near uniform annular gap between the bundle and the cavity wall for the rod portion; squeeze casting a molten light metal alloy into the mold, forming a matrix annular layer of the alloy around the bundle in said gap; machining the matrix annular layer to a predetermined shape thereby removing a predetermined machining allowance from the rod portion.

2. The method of claim 1, wherein the step of shaping bundle includes, forming bundle of a plurality of uni-directional inorganic fibers, placing the bundle in a heat-resistant shaping container, and heating the contained bundle to at least partially fuse the inorganic fibers to each other.

3. The method of claim 1, wherein the step of squeeze casting includes applying a hydrostatic high pressure of from about 500 to about 2000 kg/cm$^2$ to a molten light metal alloy poured into the mold, and solidifying the molten light metal alloy under such high pressure.

4. The method of claim 2, wherein the heating step is at a temperature of 700° C.

5. The method of claim 2, wherein the bundle is shaped to have a circular cross-section.

* * * * *